US 8,308,146 B2
(12) United States Patent
Dulphy et al.

(10) Patent No.: US 8,308,146 B2
(45) Date of Patent: *Nov. 13, 2012

(54) GASEOUS EFFLUENT TREATMENT APPARATUS

(75) Inventors: Hervé Dulphy, Jarrie (FR); Pascal Moine, Groisy (FR); Thierry Laederich, Pionsat (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,027

(22) Filed: Jun. 30, 2011

(65) Prior Publication Data

US 2011/0259196 A1 Oct. 27, 2011

Related U.S. Application Data

(62) Division of application No. 10/592,336, filed as application No. PCT/FR2005/050198 on Mar. 30, 2005, now Pat. No. 8,016,271.

(30) Foreign Application Priority Data

Mar. 31, 2004 (FR) ...................... 04 50640

(51) Int. Cl.
B01F 3/04 (2006.01)
(52) U.S. Cl. ................. 261/87; 261/93; 96/244; 96/332; 96/342
(58) Field of Classification Search .................... 261/87, 261/88, 91, 93; 96/244, 269, 279, 332, 337, 96/342, 361
See application file for complete search history.

(56) References Cited

U.S. PATENT DOCUMENTS

| 3,497,185 A | * | 2/1970 | Dively ................. 261/36.1 |
| 4,249,828 A | | 2/1981 | Condolios |
| 4,290,885 A | | 9/1981 | Kwak |
| 4,686,940 A | | 8/1987 | Fulleman |
| 4,846,965 A | * | 7/1989 | Clifft et al. ............ 210/96.1 |
| 5,061,453 A | | 10/1991 | Krippl et al. |
| 5,108,662 A | | 4/1992 | Litz et al. |
| 5,413,765 A | | 5/1995 | Smith et al. |

(Continued)

FOREIGN PATENT DOCUMENTS

EP 1 027 918 8/2000

OTHER PUBLICATIONS

Perry's Chemical Engineer's Handbook, 6$^{th}$ ed., McGraw-Hill Companies, pp. 20-97, 1984.

(Continued)

Primary Examiner — Charles Bushey
(74) Attorney, Agent, or Firm — Patricia E. McQueeney

(57) ABSTRACT

An apparatus and method for the treatment of gaseous effluents involving contact with a liquid may include a gas/liquid contact chamber which can receive a liquid in the lower part thereof and which is topped with a gas cover, wherein the chamber allows a gas to be treated. The chamber may also release residual gases following treatment involving contact with the liquid. The apparatus may also include a turbine that includes one or more stages which ensure improved contact between the gas and the liquid, the upper part of the turbine being equipped with an opening for drawing the gas situated in the gas cover above the liquid; and, preferably, a sensor for measuring the pH of the liquid.

15 Claims, 9 Drawing Sheets

U.S. PATENT DOCUMENTS

Figure 1:
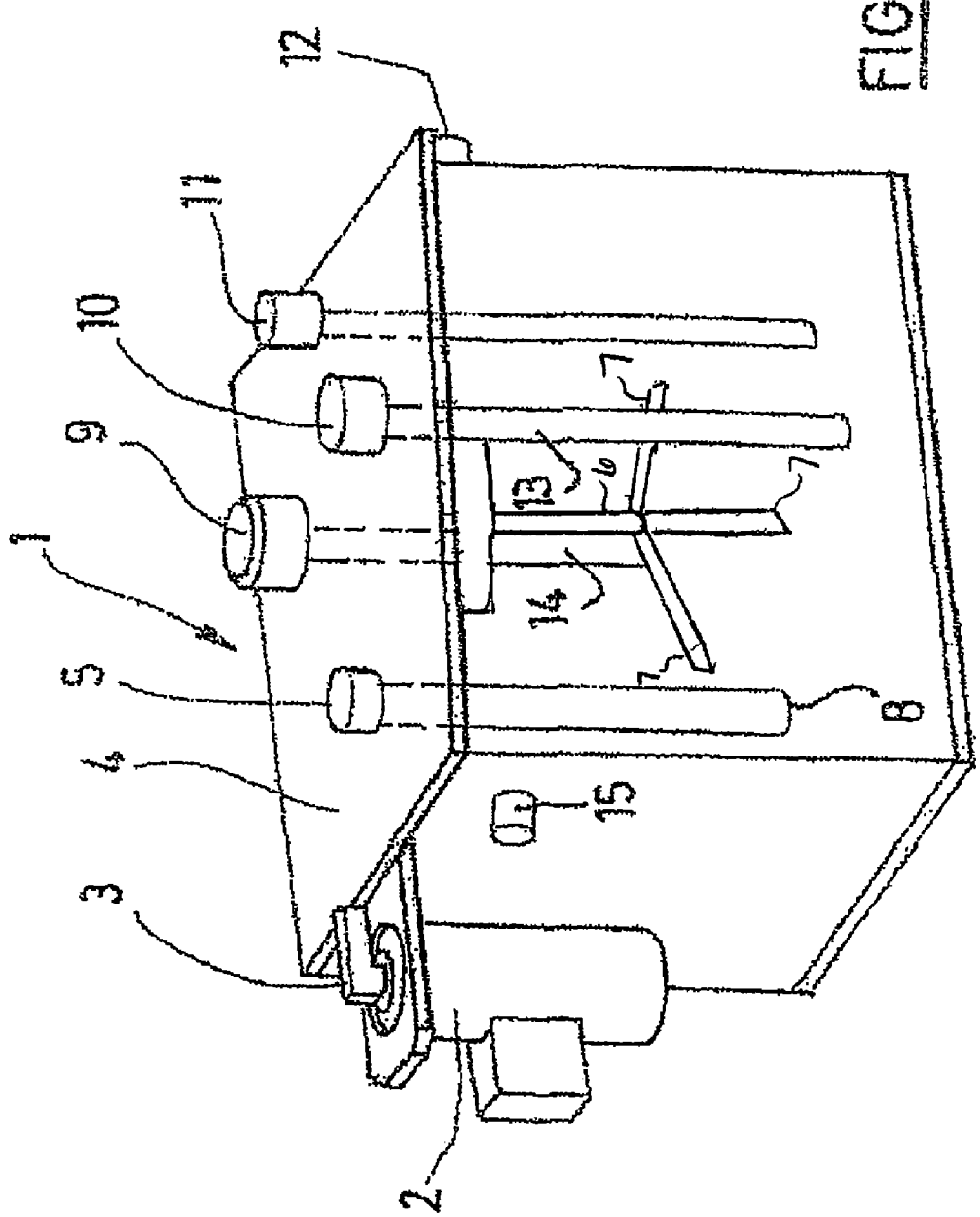

| | | |
|---|---|---|
| 5,762,883 A | 6/1998 | Okazoe et al. |
| 5,795,504 A | 8/1998 | Berchotteau |
| 5,996,975 A | 12/1999 | Shin |
| 6,007,055 A | 12/1999 | Schifftner |
| 6,109,449 A | 8/2000 | Howk et al. |
| 6,284,024 B1 | 9/2001 | Nilsen et al. |
| 6,966,983 B1 * | 11/2005 | McWhirter et al. .......... 210/150 |
| 2007/0205522 A1 | 9/2007 | Dulphy et al. |

OTHER PUBLICATIONS

International Search Report for PCT/FR2005/050198, Sep. 14, 2005.

* cited by examiner

GASEOUS EFFLUENT TREATMENT APPARATUS

CROSS REFERENCE TO RELATED APPLICATIONS

This application is a divisional application of application no. 10/592,336 filed Sep. 11, 2006, issued as U.S. Pat. No. 8,016,271, which is a national stage entry under 21 USC §371 of PCT/FR2005/050198 filed Mar. 30, 2005, which claims priority to French application 0450640 filed Mar. 31, 2004, the entire contents of which are incorporated herein by reference.

BACKGROUND

The present invention relates to an apparatus for treating gaseous effluents by contact with a liquid.

In a semiconductor production line, vacuum pumps are often connected to deposition or etching reactors which, during phases in which the manufacturing process is implemented, release toxic and corrosive gases such as HF, $F_2$, HC, $Cl_2$, $NH_3$, etc. These gases are highly corrosive and therefore raise problems in the design and construction of the effluent treatment and destruction circuits, problems which are difficult to solve, particularly concerning the choice of materials to be used.

In order to treat the gases or fluids thus issuing from these machines at the source, that is, at the outlet of the vacuum pump, it is necessary to have compact apparatus which can be installed directly under the deposition and/or etching reactors of the circuits, and particularly under the drop ceilings of the white rooms according to the current design of these white rooms.

In order to solve the problem thus posed, the apparatus for treating gaseous effluents according to the invention is characterized in that it comprises:
- a gas/liquid contact chamber for receiving a liquid in its lower part, surmounted by a gas overhead, said chamber comprising means for introducing a gas to be treated and means for removing the waste gases after treatment by contact with the liquid,
- gas/liquid contacting means of the turbine type, for ensuring improved contact of the gas with the liquid, said means comprising an opening in their upper part, for drawing out the gas from the gas overhead above the liquid, preferably, means for measuring the pH of the liquid,
- optionally, means for changing and/or controlling the pH of the liquid.

Preferably, the apparatus of the invention further comprises means for removing the liquid after a predefined period.

Also preferably, it comprises demisting means for trapping the liquid droplets in the waste gases discharged, said means being connected to the means for removing the gas to be treated.

The gas/liquid contact chamber preferably comprises antivortex walls and can thereby, for example, be made in the form of a parallelepiped-shaped chamber.

Various exemplary embodiments are possible:
- If no negative pressure is useful or necessary for the device placed upstream of the apparatus of the invention, the means for introducing the gas to be treated are placed in the lower part of the gas/liquid contact chamber, in order to inject the gas into the liquid when the apparatus is in operation. These means for introducing the gas to be treated are preferably placed, with respect to the gas/liquid contacting means, so that when the gas to be treated is injected into the liquid, the gas bubbles created pass into the field of action of said contacting means,
- If a slight negative pressure, for example, between −10 mbar and −500 mbar gauge, is useful or necessary for the equipment placed upstream, it is preferable to inject the gases to be treated directly into the gas overhead of said apparatus, to take advantage of the natural suction capacity, created by the gas/liquid contacting means, particularly in the case, for example, of a hollow-shaft turbine.
- If a higher negative pressure is required by the upstream equipment, for example, between −50 and −500 mbar, or a more intensive trapping of the solids, for example, of the reaction byproducts produced upstream of the apparatus, an injector can be placed in a scrubber inlet line. This injector may be supplied in two ways: by a submersible pump mounted on the same shaft as the turbine, or by a second submersible pump unit juxtaposed with the turbine device.

According to a preferential embodiment of the invention, the gas/liquid contacting means comprise an upper part not immersed in the liquid during the operation of the apparatus, said upper part comprising an opening connected to suction means for drawing off the gas overhead located above the liquid and for reinjecting it into the liquid. For example, the contacting means may consist of a rotary "turbine" type device which, by its rotation in the liquid (about the vertical shaft to which it is connected, shaft driven by a motor actuated by any means) creates a negative pressure in the line to which the turbine is connected. This "turbine" device is designed to draw out the gases from the gas overhead above the liquid via its hollow shaft, for example using an opening in the upper part, and to inject the same gases into the liquid via the hollow turbine at the hollow shaft end.

According to a variant of the invention, this device serves to partially recycle the gases before discharge, in order to scrub these gases several times in the liquid.

Preferably, the gas/liquid contacting means consist of a turbine immersed, in operation, in the liquid and rotating about a vertical axis. This vertical axis may, for example, be off-centered in the gas/liquid contact chamber.

The gas/liquid contacting means may consist, for example, of a surface turbine (which draws the liquid from the bottom of the chamber into contact with the gases at the surface) or a turbine located deep in the liquid (which draws the gases at the surface to inject them into the liquid).

Figures 6A, 6B:
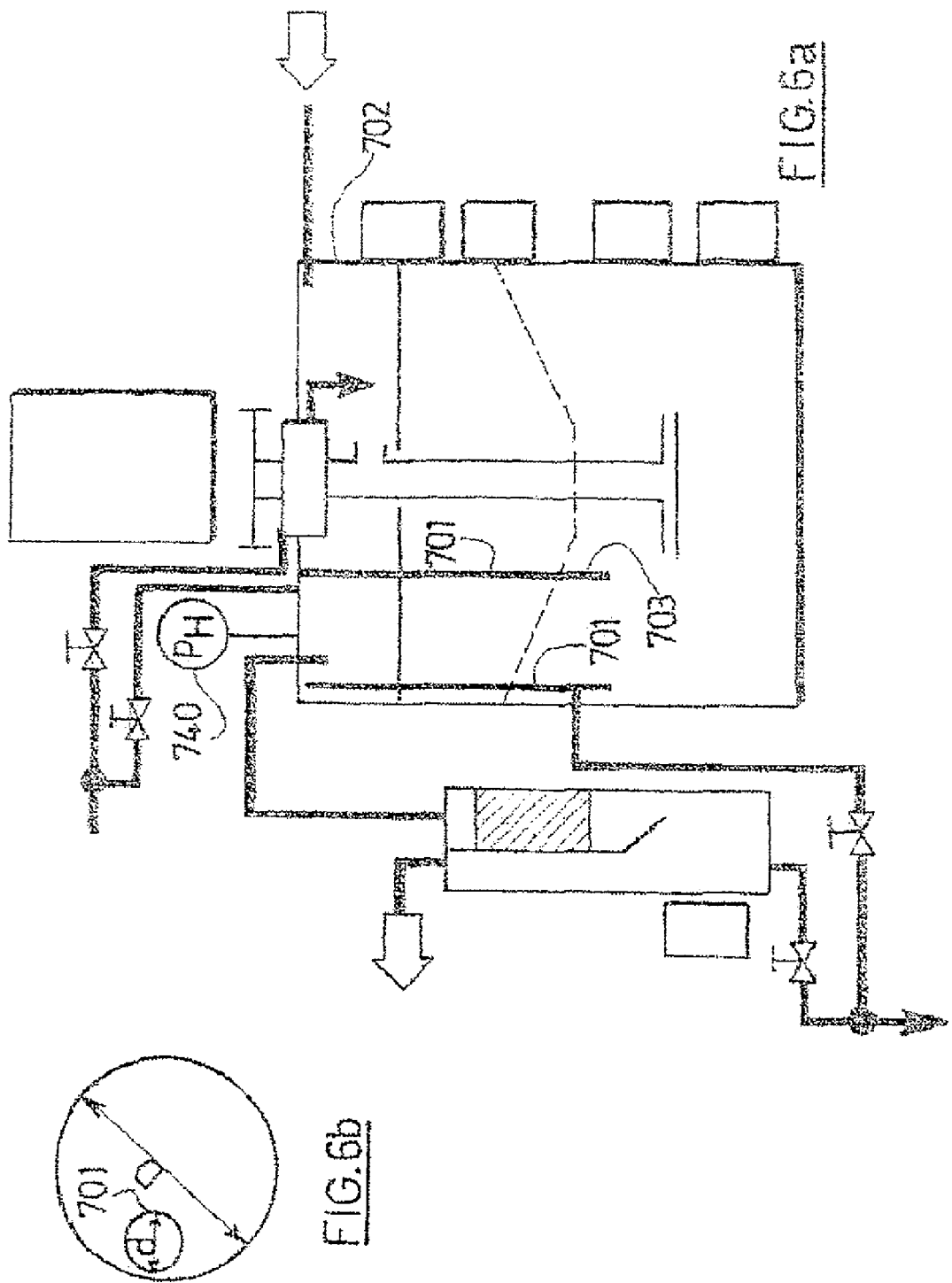
Figure 7:
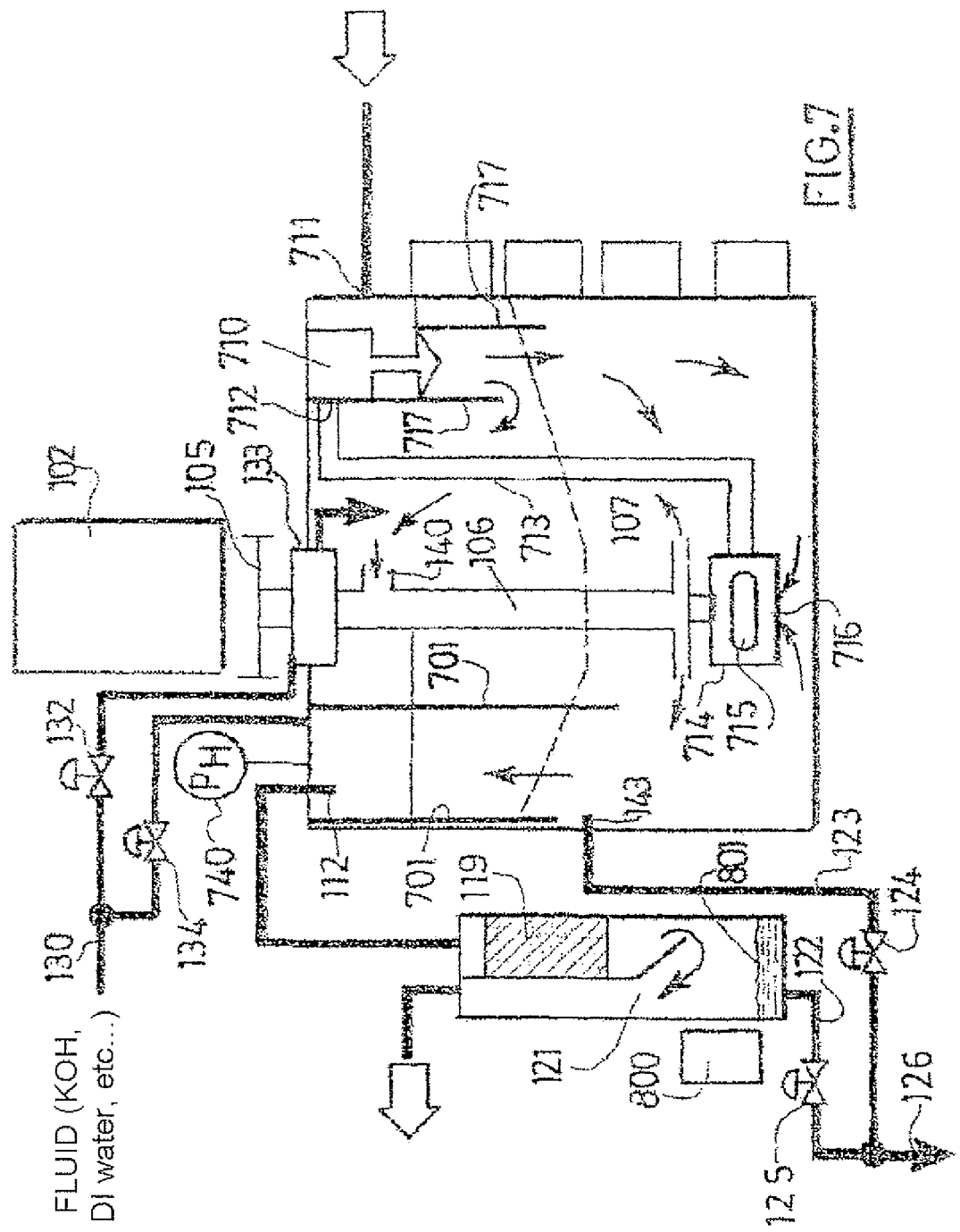
Figure 8:
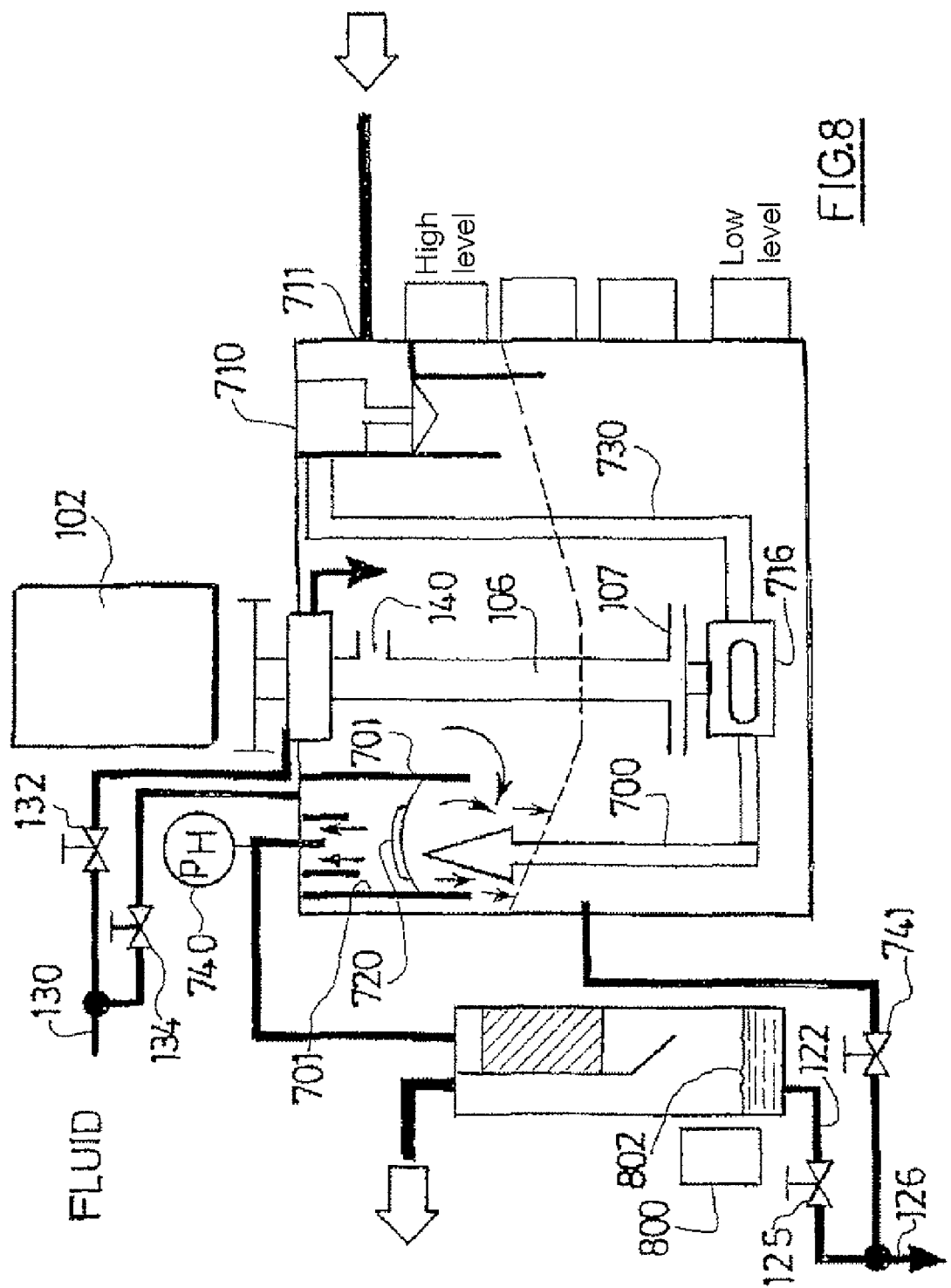

The invention will be better understood from the following nonlimiting exemplary embodiments in conjunction with the figures which show:
  FIG. 1, a general view of the apparatus of the invention,
  FIG. 2, a schematic cross-sectional view of the apparatus in FIG. 1 in its atmospheric version, that is, with injection of the gas to be treated into the liquid,
  FIG. 2A, a schematic cross-sectional view of the apparatus in FIG. 1 in its admospheric version, that is, with injection of the gas to be treated into the liquid, in one embodiment,
  FIG. 3, a graphic representation of the turbine suction capacity as a function of the motor rotation frequency,
  FIG. 4, a graphic representation of the $CO_2$ gas destruction/conversion rates as a function of the flow rate of gas to be treated,
  FIG. 5, an exemplary embodiment of the invention as shown in FIG. 2, comprising additional means for increasing the gas/liquid mixing, FIG. 5A, one embodiment of the invention as shown in FIG. 2, comprising additional means for increasing the gas/liquid mixing, FIGS. 6a and b show another exemplary embodiment of FIG. 2 with subatmospheric injection of the gas into the gas overhead located above the liquid, FIG. 7 shows a variant of FIG. 2 comprising two stages for dispersion of the gas to be treated in the liquid, FIG. 8 shows another variant of FIG. 2 comprising three stages for dispersing the gas to be treated in the liquid.

The apparatus shown in FIGS. 1 and 2 will now be described. This apparatus comprises:

- a gas/liquid contact chamber 1 of preferably parallelepiped or otherwise cylindrical shape, but equipped with anti-vortex walls, made from a corrosion-resistant but preferably inexpensive material like, for example, polyvinyl chloride or polypropylene,
- a gas/liquid contactor consisting of a motor-driven bottom turbine, a hollow shaft 6 and hollow blades 7. The gas to be treated is injected either via the inlet orifice 15 directly into the liquid, or into the gas overhead above the liquid. In some cases, a vertical tube of the same diameter as the turbine may be installed, drawing the liquid from the bottom of the chamber, thereby improving the homogeneity of the treatment liquid and hence the treatment efficiency. The blades 7 of the turbine are connected to the vertical hollow shaft 6 which extends to 8,
- a pH meter (or more: 9 and 10 in FIG. 1) for controlling the pH of the treatment solution, as required, either by the injection of water (inlet 13), caustic soda or acid (inlet 14) preferably by a servocontrolled proportioning pump,
- a valve for draining the treatment effluent (not shown, FIG. 1), to a storage unit or the settling and neutralization station,
- a gas outlet in the gas overhead for removing the treated gas to the conventional (adsorption) discharge and final treatment circuits,
- a demister to trap the water droplets in suspension in the gas just before discharge into the conventional circuit for treating the usual acidic gaseous effluents ($CO_2$, etc.).

Figure 2:
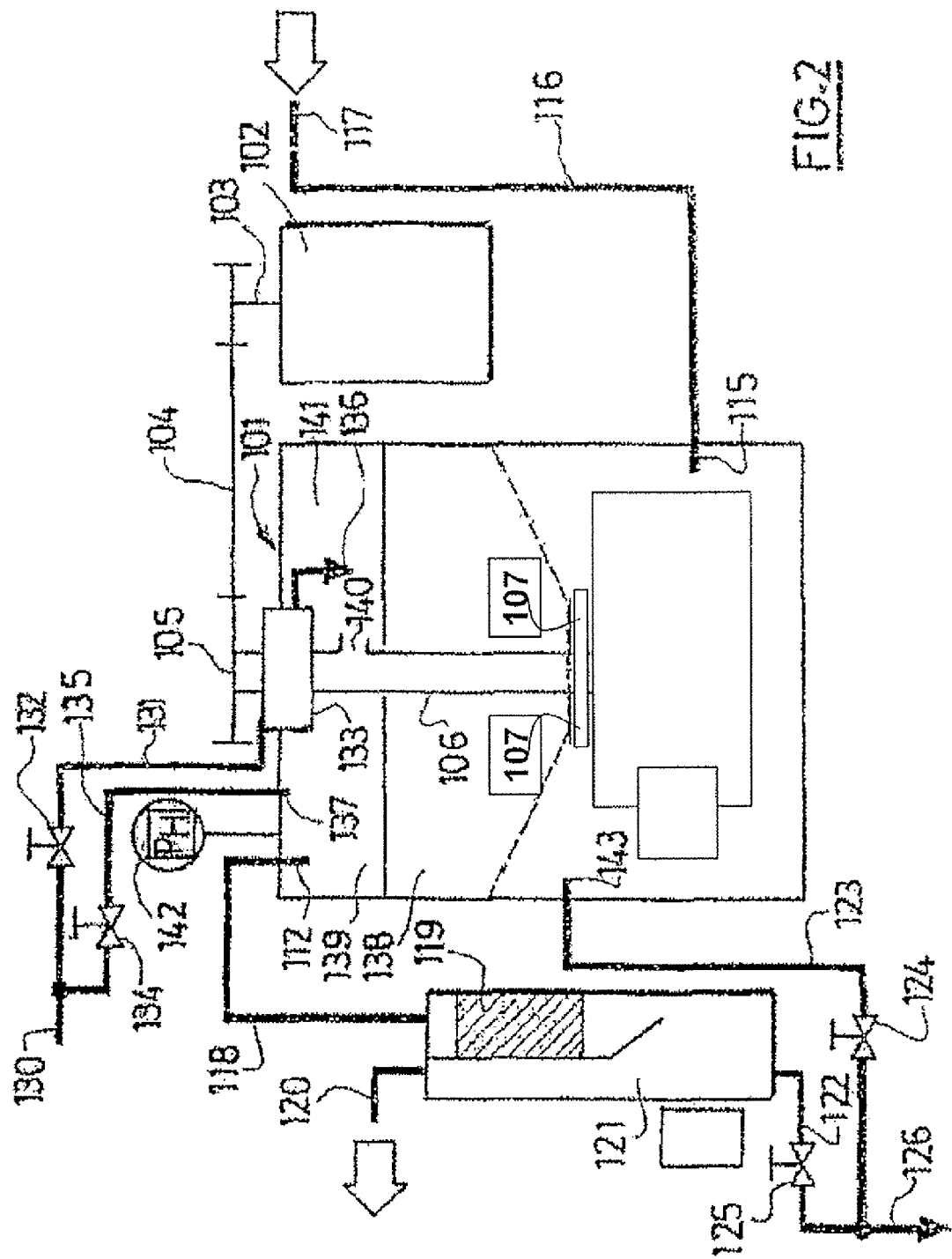
Figure 2A:
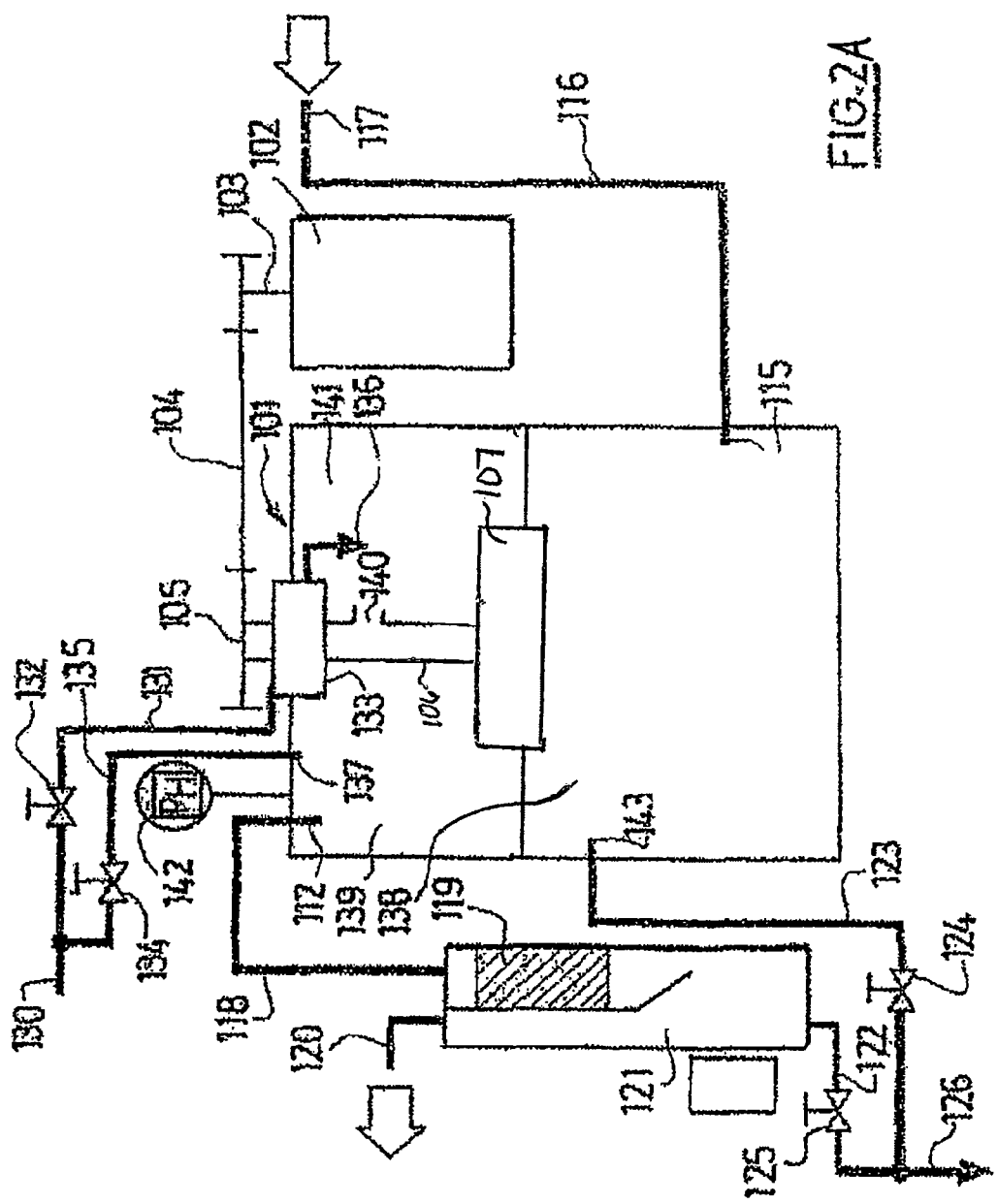

FIG. 2 shows a cross-section of the device in FIG. 1.

The gas/liquid contact chamber 101 is filled with water 138 (or any other appropriate liquid desired) to a level 139 without mixing, below the suction 140 of the turbine 106, 107 in the gas overhead 141 above the liquid level 139.

A bearing 133 traversed by the vertical shaft 106 of the turbine and connected to the gear wheel 105, serves to transmit the rotary movement to the turbine 107 via a notched belt 104, and a gear wheel 103 directly mounted on the motor 102.

The gas to be treated is injected at 117 via the line 116 into the lower part 115 of the parallelepiped-shaped chamber 101 (for the atmospheric variant of the scrubber), the gas entering at 115 into the chamber 101 is injected into the field of action of the turbine 107, of which the strong stirring generates an effective transfer area of the gas by fine dispersion into the liquid 138.

The gas after treatment (that is after several circulations in the water in the atmospheric variant of the scrubber, passage into the gas overhead, suction from the gas overhead and reinjection into the bottom of the bath by the turbine 107), is removed via the opening 112, the line 118, the passage on a demister 119 to remove the excess moisture, followed by passage into the cavity 121 and escape via the orifice 120 (to dry treatment or directly to the atmosphere, as required). The cavity 121 comprises a discharge system 122 and the valve 125 of the trapped liquid which flows to the gravity drain line 126. A line 123 is connected to the same drain 126 via the valve 124. This circuit permits the removal from the branch 143 of the surplus liquid flowing from 121 via 124 and 123 necessary for stabilization in the liquid composition and the removal of excess suspended matter.

A pressure sensor 142 is placed in the gas overhead 141 to monitor the pressure above the liquid and to avoid overpressures.

Deionized water is injected at 130 via two branches: the valve 134 and the line 135 (make-up of drained liquid by water or fresh product) and the valve 132 and the line 131, followed by injection at 136 after passage through 133 (lubrication of the upper bearing of the turbine shaft).

The operation of the system described in FIGS. 1 and 2 is explained below.

The chamber filled with water is equipped with a surface or bottom stirring turbine designed to increase the gas/liquid transfer area to accelerate the absorption of the corrosive gases in the treatment solution. To improve these exchanges, the treated gas is directly injected under the stirring turbine (in the specific case of the atmospheric variant of the scrubber). In the case in which a surface turbine is used, according to a variant of the invention, better stirring is obtained by drawing the water from the bottom using a vertical tube (or by adopting a solution described in FIG. 5). The treated gas is removed to the central treatment circuit, in the case of semiconductor production, via a hydraulic valve and a demister.

Depending on the pollutants to be removed, the pH of the treatment solution can be adjusted by adding basic product or only water, servocontrolled by the pH control. It should be observed that for an alkaline gas like $NH_3$, the injection of caustic soda is useless, and the pH control can be used to inject water. The drainage of the treatment solution is preferably controlled both by the pH control and the level control. The spent solution is removed either to a storage unit or to a neutralization station.

Among the advantages of the invention described above, mention can be made in particular of: the versatility of such an apparatus because it serves to treat very different pollutant fluids or gases, while causing a very small pressure drop in the chamber, that is, causing no disturbances in the operation of the vacuum pumps installed at the outlet of the semiconductor deposition or etching chambers.

The power consumption for such a system has proved to be low (about 50 to 500 watts) and a compact geometry can be devised to make this apparatus installable under the drop ceiling of the white rooms.

Figure 3:
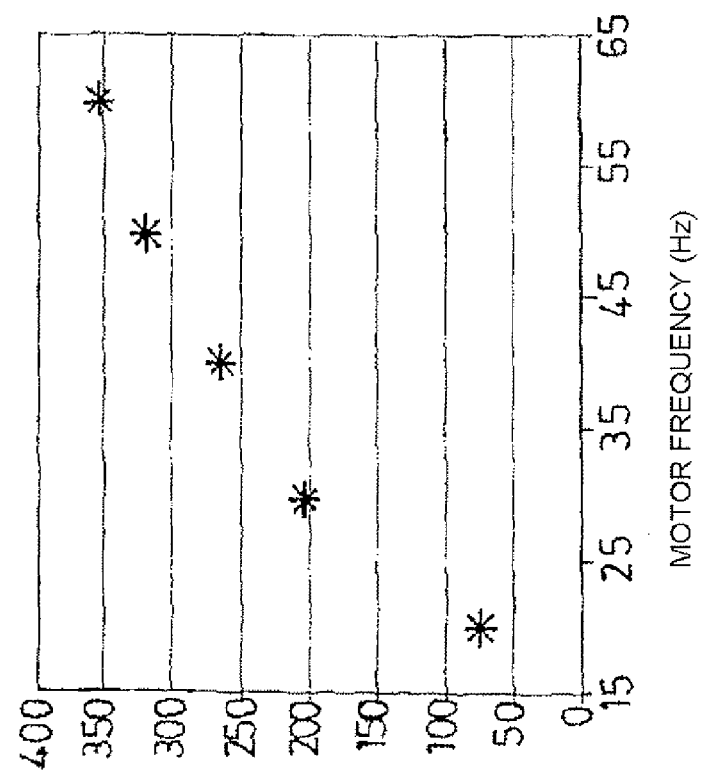

FIG. 3 shows an example of the suction capacity of a turbine of the invention as a function of the motor rotation frequency. The treatment capacity of the apparatus of the invention can thereby be easily adjusted by increasing the rotation frequency of the motor, since this capacity is multiplied by a factor of about 6 for a frequency increase of about 2.5.

Figure 4:
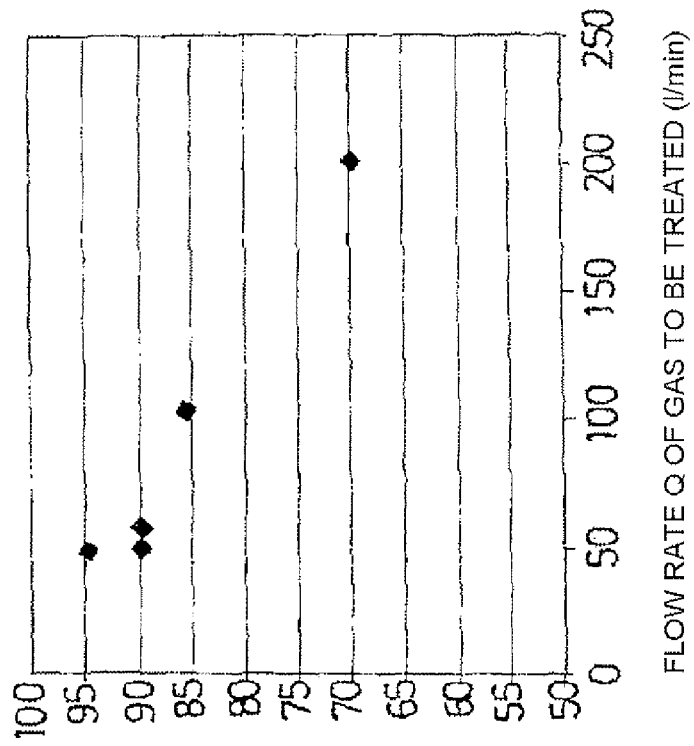

FIG. 4 shows an example of a graphic representation of the $CO_2$ gas treatment rate with water as a function of the flow rate of gas to be treated for an inlet concentration of 2500 ppm of $CO_2$ in the gas to be treated and a suction flow rate of 300 liters per minute thanks to the turbine. Thus, for a flow rate of 50 liters per minute, the destruction rate of carbon dioxide obtained is 95%, dropping to 70% for a flow rate of 200 liters per minute of gas to be treated.

In applications requiring higher destruction rates (ORE), use can be made selectively of the multistage options described below (the turbine solution alone in FIG. 2 constituting the common single stage base) in FIGS. 6, 7 and 8.

Figure 5:
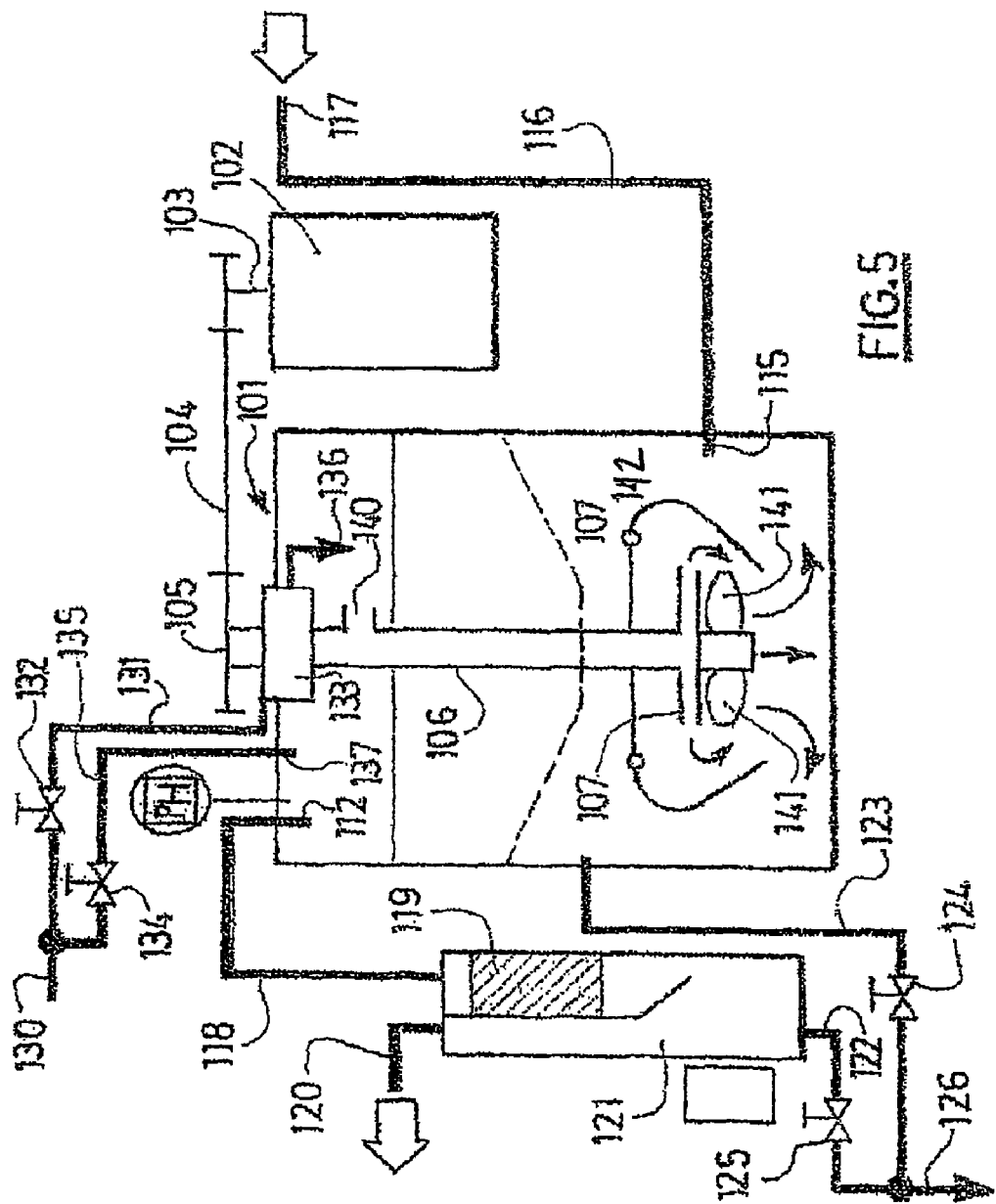
Figure 5A:
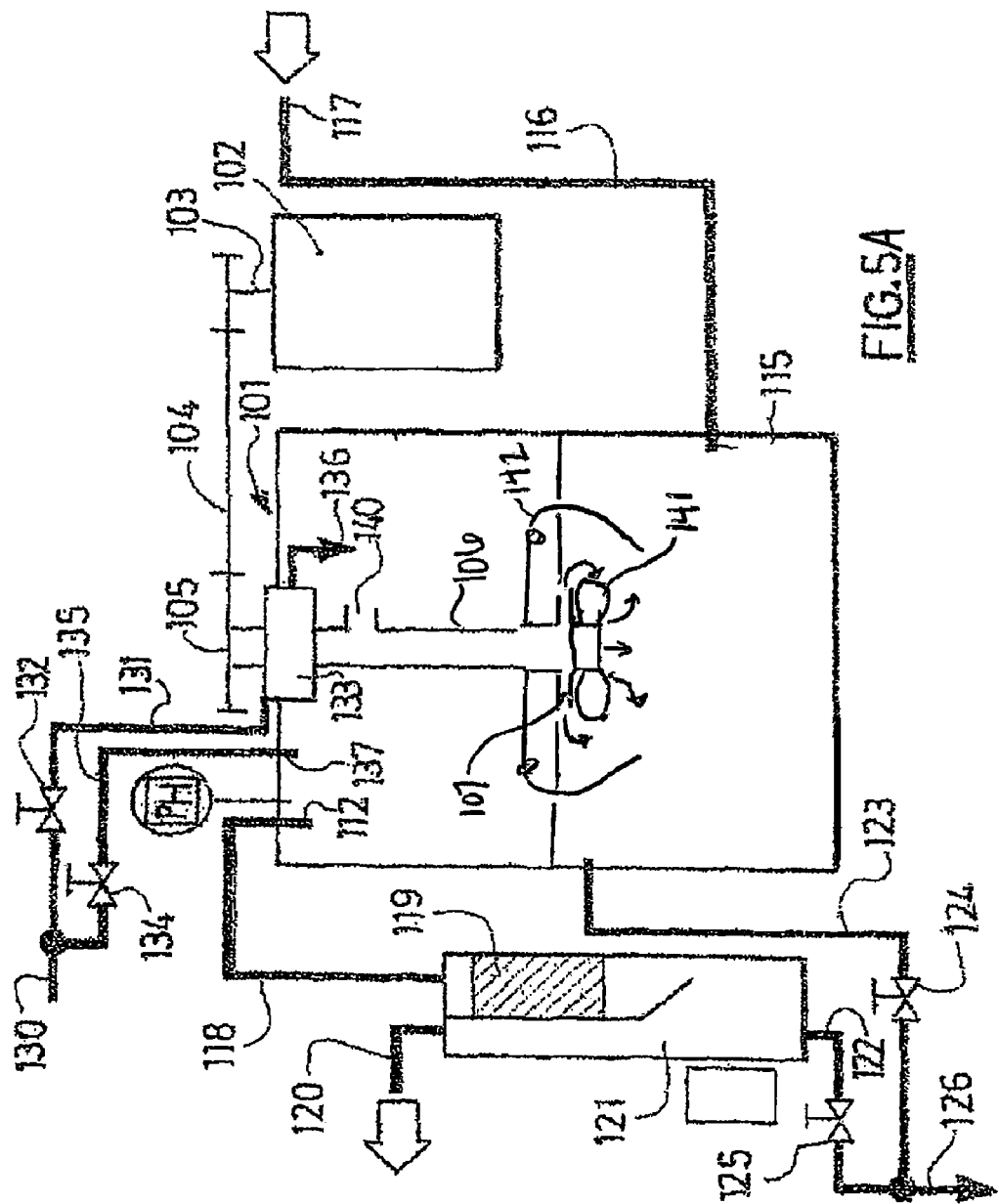

FIG. 5 shows a modification of the system described in FIG. 2, making it possible, if necessary, to increase the gas/liquid contact efficiency and thereby increase the destruction/treatment rate of gas entering the apparatus of the invention, particularly in the case in which the turbine is close to the surface. For this purpose, a housing 142 may be provided, covering the turbine 107 and which extends to a level below the gas outlet of the turbine 107, with the optional addition of fins 141 integral with the turbine shaft 106. These fins improve the stirring in the liquid and thereby favor the material transfer, said fins also allowing the discharge of the mixture to the bottom of the receptacle (According to their orientation) thereby lengthening the residence time and increasing the gas-liquid exchange in the vessel. Obviously, to allow gases to enter the mixing chamber, it may be possible (not shown in the figure) either to connect the end 115 of the line 116 directly to the inlet of the housing 142, or more simply, to provide one or more openings in the housing. This variant of the invention with a protective housing around the turbine and/or the system of fins 141 forming a propeller which discharges the mixture to the bottom of the receptacle, is obviously applicable to the variants in FIGS. 6, 7 and 8 below.

The apparatus described in FIG. 6 corresponds to the case in which a slight negative pressure is necessary or preferable to improve the operation of the gaseous effluent plasma destruction apparatus placed upstream of the apparatus of the invention. Furthermore, the suction serves to reduce the inline pressure drop of the gas-scrubbing apparatus according to the invention. In this figure, the same elements as those in the preceding figures bear the same reference numerals.

The gas overhead above the liquid is under slight negative pressure when the motor rotates the turbine. The gases to be treated are injected into the gas overhead, drawn via the opening in the turbine axis, discharged into the liquid via the ends of the turbine, and then recirculated in the vessel and re-drawn via the opening in the turbine axis, etc. However, part of these gases escapes in the "water seal" 701 which is better shown in FIG. 6b. This water seal has the shape of a pipe, for example cylindrical 701, with diameter d, placed inside the receptacle 702, for example cylindrical also, of diameter D. In practice, it is important to determine a good compromise of the d/D ratio to obtain good material transfer efficiency and to avoid drawing out all the gases present in the gas overhead (so that they can be recycled several times through the treatment liquid). To find the best compromise, it suffices to perform a few tests with pipes 701 of different diameters and to record the destruction rates obtained. The bottom end 703 of the tube 701 must be immersed in the liquid to permit this pressure differential between the gas present in the upper part of the pipe 701 and which is discharged toward the outlet, and the gas which constitutes the gas overhead above the liquid in contact with the gas inlet in the treatment receptacle.

FIGS. 7 and 8 show variants of the embodiment in FIG. 2, corresponding to destruction rates (DRE) higher than the one supplied by the apparatus in FIG. 2.

The example described in this FIG. 6 corresponds to the case of a slight negative pressure of about 10 to 50 mbar (1 to $5\times10^3$ pascal).

FIG. 7 shows a subatmospheric variant of the apparatus of the invention, comprising two stages for dispersing gas to be treated in the treatment liquid. The gas, injected into the gas overhead above the liquid, is drawn out by the treatment liquid in a hydro-injector type of device.

In general, a person skilled in the art will find all the necessary information concerning the equipment to be used in the book by P. Perry et al. entitled "Perry's Chemical Engineer's Handbook, $6^{th}$ Edition", particularly page 20-97 (this was.

The liquid fed to this hydro-injector originates from a submersible pump placed under the turbine and connected to the drive shaft of the turbine. The rotation of the drive shaft of the turbine causes the rotation of the vanes 715 of the submersible pump 714. The liquid is sucked out via an opening 716 under the pump 714.

According to a variant of the invention, the pump can be placed outside the treatment vessel, that is, not immersed.

A line, for example, cylindrical 717 surrounds the hydro-injector 710 at the outlet of the gas/liquid mixture in order to limit the lateral expansion of the outgoing jet of gas/liquid mixture. The liquid returns by gravity to the liquid bath, the part of gas unreacted with the liquid in the hydro-injector returning to the gas overhead to be drawn out again at the suction inlet 140 at the shaft of the turbine. The dimensions of the line 717 must be limited in order to control the pressure drop and to obtain a higher negative pressure, of about 50 to 500 mbar (or $5\times10^3$ pascal to $5\times10^4$ pascal).

As in FIG. 6, a discharge line 701 is provided for the treated gases issuing from the liquid.

As previously, the liquid used has a pH adapted to the gas to be treated (hence generally a pH>7 for generally acid gases) to obtain the desired chemical reaction, or simply water (from the mains at pH 7) in which the gases are absorbed in the liquid. As previously, means are provided for measuring the pH and, optionally, means for controlling it, by maintaining it in a range of predefined values, either by adding additives of opposite pH, or by replacing the solution when it becomes off-specification (outside range).

To improve the gas/liquid exchange, it may be preferable to blend surfactants with the liquid, particularly water, in small quantities to avoid foaming, so as to decrease the size of the gas bubbles and increase the gas/liquid exchange area.

The variant of the embodiment in FIG. 8 corresponds in particular to a three-stage gas/liquid exchange system, comprising, in addition to the two stages shown in FIG. 7, a third stage comprising an exit line 700 of the submersible pump 716, which sends part of the liquid drawn by the pump 716 to the exit line 701, projects it on a deflector 720, for example, whose function is to lower this liquid in a countercurrent spray to the gas issuing from the liquid (from the gas overhead) preferably in the form of a flat circular jet. According to another variant of the embodiment, a static mixer can also be connected, connected at its other end to the external discharge of the gases after treatment. An example of appropriate static mixers is described, for example, in the work by W. L. McCabe entitled "Unit Operations of Chemical Engineering" $5^{th}$ Edition.

FIG. 8 also shows a level detector 800 for detecting the level of fluid 801 recovered in the demister, this detector controlling the drainage at the gravity drain 128 via the controlled valve 125 and the line 122. Similarly, the drainage of the vessel is controlled by the pH detector 740 which opens the drain valve via 123 and 126.

According to the invention, the gas/liquid contacting means provide energy (motor driven means) in order both to produce a compact system generating very little pressure drop or no or negative pressure drop, such a system, by a pumping effect, improving the circulation of the gaseous effluents in the gaseous effluent discharge lines.

According to another variant of the invention, a system known per se and called a hydro-cyclone can be provided, for separating the solid phase from the liquid phase of the liquid after use in the vessel. Such a system serves to recycle the water thus cleansed of its solids, to the apparatus of the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for treating gaseous effluents by contact with a liquid, wherein the apparatus comprises: a) a gas/liquid contact chamber for receiving a liquid in its lower part, surmounted by a gas overhead, said chamber comprising means for introducing a gas and means for removing the waste gases after treatment by contact with the liquid; b) gas/liquid contacting means for ensuring improved contact of the gas with the liquid consisting of a surface turbine, said means comprising an opening in its upper part, for drawing out the gas from the gas overhead above the liquid; and c) means for measuring the pH of the liquid.

2. The apparatus of claim 1, further comprising means for changing and/or controlling the pH of the liquid.

3. The apparatus of claim 1, further comprising demisting means for trapping the liquid droplets and connected to the means for removing the waste gases after treatment.

4. The apparatus of claim 1, wherein the gas/liquid contact chamber has a parallelpiped or cylindrical shape.

5. The apparatus of claim 1, wherein the means for introducing the gas to be treated are placed in the lower part of the gas/liquid contact chamber, in order to inject the gas into the liquid when the apparatus is in operation.

6. The apparatus of claim 1, wherein the means for introducing the gas to be treated are placed in the upper part of the gas/liquid contact chamber, in order to inject the gas into the gas overhead when the apparatus is in operation.

7. The apparatus of claim 1, wherein the gas/liquid contacting means comprise an upper part not immersed in the liquid, during the operation of the apparatus, said upper part comprising an opening connected to suction means for drawing off the gas overhead located above the liquid and for reinjecting it into the liquid in order to circulate the gas constituting the gas overhead several times in the liquid.

8. The apparatus of claim 7, wherein a line conveying the gas drawn out of the gas overhead and injected into the liquid via the turbine has an axis parallel to or merged with the axis of rotation of the turbine.

9. The apparatus of claim 1, wherein the gas to be treated is injected into the liquid via a hydro-injector.

10. The apparatus of claim 9, wherein a line surrounds the hydro-injector to limit the lateral expansion of the jet.

11. The apparatus of claim 9, wherein the hydro-injector comprises a submersible pump which recirculates the liquid via a line connected to the hydro-injector.

12. The apparatus of claim 1, further comprising a submersible pump which sends the liquid to an exit line connected to the gas overhead above the liquid bath, in which is placed a deflector which sprays the liquid jet issuing from the pump in countercurrent to the gases removed via the exit line.

13. The apparatus of claim 1, wherein the means for measuring the pH of the liquid controls a valve for removing the liquid solution to a drain.

14. The apparatus of claim 2, wherein the means for controlling the pH of the liquid includes injecting water, caustic soda, or acid into the liquid into one or more inlets coupled to chamber.

15. The apparatus of claim 1, wherein the gas/liquid contacting means includes a vertical tube that is used to draw the liquid from the bottom of the chamber to the gas overhead.

* * * * *